United States Patent [19]

Meister

[11] Patent Number: 4,856,422
[45] Date of Patent: Aug. 15, 1989

[54] HEAT TREATMENT OF FOOD WITH FLOW-DEPENDENT CONTROL

[76] Inventor: Siegfried Meister, Siemensstrasse 2,, 8910 Landsberg, Fed. Rep. of Germany

[21] Appl. No.: 865,181

[22] Filed: May 20, 1986

[30] Foreign Application Priority Data

May 23, 1985 [DE] Fed. Rep. of Germany ....... 3518498

[51] Int. Cl.[4] .............................................. A47J 27/00
[52] U.S. Cl. ....................... 99/330; 99/337; 126/21 A; 219/400; 219/401
[58] Field of Search ................ 99/323, 326, 328, 330, 99/337, 338, 344, 447, 339, 401, 451; 219/400, 401; 126/21 R, 21 A

[56] References Cited

U.S. PATENT DOCUMENTS

| | | | |
|---|---|---|---|
| 4,132,878 | 1/1979 | Tachikawa et al. | 219/400 |
| 4,238,447 | 12/1980 | Wolff | 422/26 |
| 4,263,258 | 4/1981 | Kalasek | 422/26 |
| 4,395,383 | 7/1983 | Kackos | 422/26 |
| 4,403,128 | 9/1983 | Takagi et al. | 219/400 |
| 4,426,923 | 1/1984 | Ohata | 219/400 |
| 4,506,598 | 3/1985 | Meister | 99/330 |
| 4,587,393 | 5/1986 | Ueda | 99/451 |

FOREIGN PATENT DOCUMENTS

| | | | |
|---|---|---|---|
| 0171522 | 5/1985 | European Pat. Off. | 99/330 |
| 85106278.6 | 5/1985 | European Pat. Off. | |
| 8131827 | 4/1983 | Fed. Rep. of Germany . | |
| 1161551 | 8/1969 | United Kingdom . | |
| 2076527 | 12/1981 | United Kingdom | 99/403 |

*Primary Examiner*—Henry J. Recla
*Assistant Examiner*—Linda J. Sholl

[57] ABSTRACT

The invention relates to a process and to an apparatus for regulating a heat treatment of foods, particularly a cooking of meals, by means of steam or a steam/air mixture in a cooking area and by a steam supply regulatable subject to a sensor, a disturbance being forced on to a cooking area flow in the vicinity of a stationary connecting opening between the cooking area and the ambient and which contains the sensor for the purpose of forming a local vacuum.

12 Claims, 3 Drawing Sheets

HEAT TREATMENT OF FOOD WITH FLOW-DEPENDENT CONTROL

BACKGROUND OF THE INVENTION

The invention relates to a process for regulating a heat treatment of food, particularly the cooking of meals by means of steam or a steam/air mixture, in a cooking area and by a steam supply regulatable subject to a sensor.

The invention also relates to an apparatus which is particularly suitable for performing such a process.

In a known process of the aforementioned type (cf. German Patent 27 31 191), control or regulation is carried out in such a way that the penetration of excess steam into a steam trap arranged in the base of the cooking area is detected by a heat sensor arranged in said drain. Under normal conditions, such a process control of the steam supply into the cooking area is satisfactory. However, the known process also suffers from disadvantages. The condensate flowing out through the condensate drain and particularly the fat dripping from food and which partly also flows through the same, heats the condensate drain. Thus, the heat sensor is constantly subject to a relatively high temperature. It is admittedly possible to arrange the heat sensor at a greater distance from the cooking area opening of the condensate drain. However, this has a disadvantageous effect on the control speed, because then the excess steam must initially pass a considerable distance into the condensate drain, before steam production can be disconnected as a result of the sensor responding.

With respect to this shortcoming, from the process standpoint a problem of the present invention is to provide a process for controlling a heat treatment of food by the use of steam or a steam/air mixture in a cooking area and a steam supply regulatable subject to a sensor, so as to at all times permit a reliable, rapid control.

SUMMARY OF THE INVENTION

According to the invention this problem is solved in that a disturbance is forced on or an obstacle placed in the cooking area flow in the vicinity of a stationary connecting opening containing the sensor and located between the cooking area and the ambient for the purpose of forming a local vacuum. According to this teaching, if the sensor is positioned in the steam trap during an operating mode, in which a flow is formed in the cooking area, ambient atmosphere is constantly sucked through the condensate drain into the cooking area. The relatively cool ambient atmosphere in this way continuously cools the sensor. If subsequently e.g. in the case of a steaming operating mode, the pressure in the interior of the cooking area rises, the lower pressure at the condensate drain inlet is still higher than the ambient atmospheric pressure. The cooking area atmosphere then penetrates the condensate drain. As soon as the cooking area atmosphere reaches the level of the sensor, the latter responds as a result of the much higher temperature of the cooking area atmosphere and steam production is then switched off.

As a result of the process according to the invention, the temperature jump detected by the sensor is always relatively large. This firstly means that the heat sensor need not be particularly sensitive and secondly that chance smaller fluctuations cannot lead to faulty switching.

From the apparatus standpoint, the invention also relates to an apparatus, which is particularly suitable for performing a process with the above indicated or hereinafter explained features, which has a cooking area, a steam supply regulatable according to a sensor and a stationary connecting opening having a cooking area opening and located between the cooking area and the ambient.

In a known apparatus, such as e.g. described in German Patent 27 31 191, as stated, a sensor is positioned in the condensate drain. If e.g. in the steaming operating mode, a product being cooked and located in the cooking area has heated to such an extent that the steam in the cooking area no longer condenses, then the steam passes out through the connecting opening, i.e. in the case of the known apparatus through the condensate drain. As a result of the higher steam temperature, this is detected by the sensor and as a function thereof the cooking area steam supply is cut off. With respect to the said apparatus, the disadvantages referred to hereinbefore in connection with the known process will occur. During the normal operating states, the condensate drain heats to a considerable extent and in this way influences the temperature measurement via the sensor.

In view of these disadvantages, it is a further apparatus problem of the invention to provide an apparatus for the heat treatment of food, which at all times permits a reliable, rapid control of the steam supply.

From the apparatus standpoint, this problem is initially and substantially solved in that in the vicinity of the cooking area opening a flow obstacle is provided and the sensor is positioned in said cooking area opening part. As a result of the flow obstacle, a local acceleration of the flow in the cooking area is obtained, which leads to a drop in the static pressure and consequently to a vacuum in the vicinity of the cooking area opening. Thus, between the cooking area opening and the ambient a pressure gradient forms and air at ambient temperature is sucked into the cooking area.

As has already been fundamentally explained, the inflowing ambient air cools the connecting opening or condensate drain or keeps same at a relatively low temperature level for as long as the static pressure at the cooking area opening is lower than the pressure in the ambient atmosphere. If then, as has already been explained, the pressure in the cooking area rises, then the (dropped) static pressure at the cooking area opening exceeds the ambient atmospheric pressure, so that then the cooking area atmosphere, substantially steam, passes outwards through the condensate drain. As soon as the cooking area atmosphere reaches the level of the sensor, the latter detects the much higher temperature and can initiate a switching operation, particularly the cutting off of the steam.

The expression "flow disturbance" used with respect to the process part of the invention, as well as the term "flow obstacle" used with respect to the apparatus part of the invention are to be equated with respect to their function. In both cases the intention is that the static pressure of the flow is to be reduced in the vicinity of the cooking area opening in order to produce a local vacuum. Thus, in principle, the invention makes use of the Venturi principle that the static pressure of a flow can be reduced by increasing the speed, i.e. the dynamic pressure of the flow.

According to a development of the process teaching of the invention, the cooking area atmosphere passing out through the connecting opening is cooled, said teaching having an independent significance. This teaching is of particular significance in connection with an apparatus modified somewhat with respect to what has been stated hereinbefore. Thus, this apparatus has an independent connecting opening connecting the cooking area with the atmosphere, e.g. a sensor tube. Such a construction also forms the subject matter of European Patent Application EP-85 106 278.5, filed on May 22nd 1985, and entitled: "Apparatus for the heat treatment of food or meals with a sensor," so that to this extent reference can be made thereto. The process teaching according to which the cooking area atmosphere passing out of the connecting opening is cooled, makes it possible to condense escaping steam and remove the condensate.

Cooling can take place in several different ways, as will be explained in greater detail hereinafter in connection with the corresponding apparatus features. Thus, the Joule-Thomson effect can be utilized, to the effect that when the volume of a gas is increased said gas is cooled. There can also be an active cooling via cooling fins, a cooling jacket or the like.

From the apparatus standpoint, according to a further development of the connecting opening is formed by a pipe part and the latter projects into the cooking area. The main intention is that the pipe part constitutes an independent connection between the cooking area and the ambient atmosphere, i.e. does not coincide with the condensate drain, but naturally this need not be the case. The fact that the pipe part projects into the cooking area in itself leads to a flow disturbance, which leads to the desired vacuum in the vicinity of the cooking area opening of the pipe part. (Pipe part is not to be understood in a strictly geometrical sense, and instead constitutes a general term for an independent component representing a connecting opening).

According to a further development, it can be provided that the flow obstacle is constructed as an independent component in the form of a deflector or the like. Appropriately the flow obstacle is then arranged in the flow direction upstream of the cooking area opening, or directly in the vicinity of said opening. Numerous different forms of such flow obstacles are known, so that a detailed description thereof will not be given here. As indicated, it is important that there is a flow acceleration in the vicinity of the cooking area opening.

According to a further development, the cooking area opening has a relatively large diameter or is at least provided in a size such that it can be easily cleaned from the cooking area. It is fundamentally not necessary, in the case of a separate connecting opening, for the cooking area opening or the connecting opening to have a particularly large diameter. On the contrary, a relatively small diameter is advantageous, because only correspondingly little ambient atmosphere is sucked through the latter during the normal steaming operation. However, in the case of a cooking area opening with a small diameter, there can very easily be a contamination and clogging of the connecting opening. This risk virtually does not occur in the case of a relatively large cooking opening because then, as stated, with the process and apparatus according to the invention, the flow in said cooking area opening is directed into the cooking area during the normal steaming operation.

Correspondingly, within the scope of the invention it is provided that a smaller diameter suction port connects on to the cooking area opening to the outside. Only the diameter of this suction port is determinative for the ambient atmosphere quantity sucked in per unit of time during normal steaming operation.

According to a further development of the apparatus according to the invention, the invention teaches that a second cooking area opening is provided, which is in flow connection with the first cooking area opening outside the cooking area, that the second cooking area opening is positioned below the first cooking area opening and that in the vicinity of the second cooking area opening an undisturbed flow occurs. The connecting opening to the ambient atmosphere or e.g. the suction port branches off from the connection between the two cooking area openings. In this construction, the sensor is appropriately located in the vicinity of the suction port or the connecting opening. In this construction, it is considered advantageous that e.g. during normal steaming operation, whereby a vacuum forms in the upper cooking area opening, cooking area atmosphere is sucked through the lower cooking area opening and then enters the cooking area again through the upper cooking area opening. Thus, the vacuum sucking in the ambient atmosphere then acts in the vicinity of the connecting opening branch. Any flowwise entrained dirt particles or the like, are deposited in the connection between the two cooking area openings, in particular, such contaminants, which are largely liquid, can flow back through the lower cooking area opening into the cooking area.

According to a further development, which also has independent significance, externally an outflow part is connected to the connecting opening and serves to cool the cooking area atmosphere which flows out. Steam contained in the latter can in this way be condensed and removed as condensate.

The cooling can be performed in different ways. For example, the outflow part can initially have outer cooling fins, which permit a greater heat dissipation with respect to said part. The outflow part can also be provided with a cooling jacket, through which a cooling fluid can be passed. Finally, the outflow part can represent a sudden flow increase with respect to the connecting opening. Whilst utilizing the Joule-Thomson effect, this leads to a cooling of the outflowing cooking area atmosphere.

The condensate obtained in the outflow part can be separately removed, but can also issue into the condensate drain via a steam trap and can then be removed together with the condensate drawn off from the cooking area bottom.

Finally, according to a further development, the connecting opening as such is connected to the condensate drain. In this construction, the cooking area opening is admittedly provided at a separate opening in addition to the condensate drain opening, but the suction of the ambient atmosphere during normal steaming operation takes place through the condensate drain opening into the ambient atmosphere.

BRIEF DESCRIPTION OF THE DRAWINGS

The invention is described in greater detail hereinafter relative to non-limitative embodiments and with reference to the attached drawings, wherein.

DESCRIPTION OF THE PREFERRED EMBODIMENT

Figure 1:
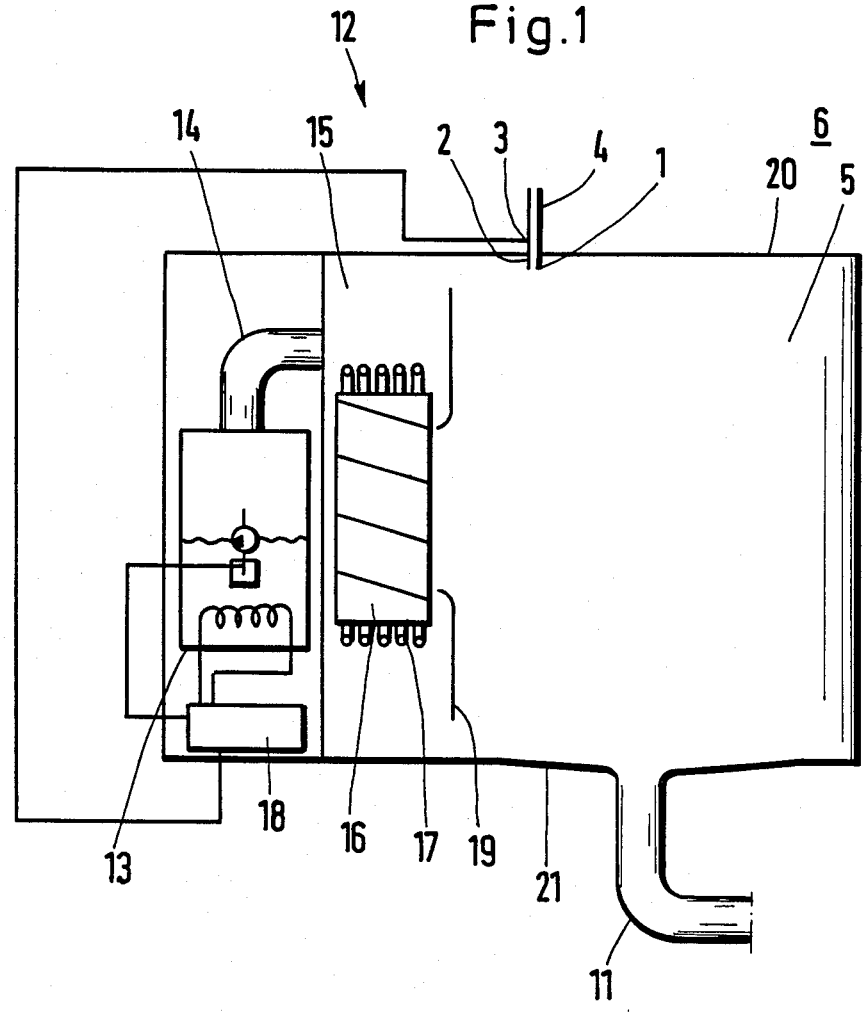
FIG. 1 is an apparatus according to the invention suitable for performing the process according to the invention.

FIG. 1 shows a basic construction of an apparatus 12 for the heat treatment of food, in which the present invention can be used. This apparatus 12 has a boiler 13 in which steam can be produced. Boiler 13 is connected via a steam supply line 14 to a pressure chamber 15. The latter contains a fan 16 which, as in the represented embodiment, can be surrounded by a heating coil 17. By means of a control system 18, particularly in the steaming operating mode, and as will be explained in detail hereinafter, it is possible to regulate steam production, as a function of the values supplied by sensor 3.

Pressure chamber 15 is separated from cooking area 5 by a wall part 19, normally a sheet metal part. During the operation of fan 16, a flow is consequently formed in the cooking area 5, which passes out at the top and bottom between the cooking area top surface 20 or the cooking area base surface 21 and wall part 19, and then flows back to the fan 16 roughly centrally with respect thereto.

Such an apparatus 12 is generally used for steaming in particular cold food or meals. Deep-frozen food or meals are thawed and heated. Other cooking processes, such as boiling, roasting and baking, are carried out in a hot air operation mode or a so-called combination steaming operation mode, in which the food or meals are subject to a mixture of steam and hot air.

As can also be seen in FIG. 1, in this embodiment the connecting opening between cooking area 5 and ambient 6 is realized by a pipe part 4. In order to achieve the fundamental result according to the invention it is not, however, necessary for the connecting opening to be formed by a pipe part 4. This result is still achieved if the already existing condensate drain 11 is used as the connecting opening. Moreover, it is not necessary for the connecting opening or pipe part 4 to be arranged on the cooking area top 20, as shown in FIG. 1. An arrangement of virtually any point of cooking area 5 is conceivable, provided that there is a detectable incident flow.

As stated hereinbefore, on switching on fan 16, a flow forms in the gap between wall part 19 and the top of the cooking area, and this is disturbed in the vicinity of the cooking area opening 1 by the pipe part 4 projecting into the cooking area 5 in the present embodiment. The portion of pipe part 4 projecting into cooking area 5 simultaneously forms the flow obstacle 2. In the vicinity of the cooking opening area 1, a flow acceleration occurs and consequently simultaneously a static pressure drop, so that a pressure difference occurs between the ambient 6 and the cooking area 5 in the vicinity of the cooking area opening 1, which sucks ambient atmosphere into cooking area 5. Thus, the sensor 3 is constantly held at the ambient atmospheric pressure. If the steam additionally introduced into the cooking area 5 during the steaming or combination steaming operating mode no longer deposits on the food and is condensed, then the pressure in cooking area 5 rises, so that finally the pressure difference between the cooking area 1 and the ambient 6 is removed or is reversed. Cooking area atmosphere then penetrates outwards through the connecting opening and sensor 3 detects the increased cooking area atmosphere temperature.

Control system 18 then stops steam production in boiler 13. The considerable amount of steam still in the cooking area 5 at this time continues to condense in the cooking area. The considerable volume change linked therewith leads to a vacuum in cooking area 5 compared with the ambient 6, so that additional ambient atmosphere is sucked through the connecting opening into cooking area 5. Thus, sensor 3 is once again subject to a lower temperature. As a function thereof, by means of control system 18, it is then possible to reactivate steam production in boiler 13.

A particular advantage of the apparatus or process according to the invention occurs on changing from the hot air operating mode to the steaming or combination steaming operating mode. During the hot air operating mode, there is considerable heating of cooking area 5, namely to temperatures of around or above 200° C. When steam production is started up, the inflowing steam is rapidly superheated, so that a pressure rise rapidly occurs, which leads to the cooking area atmosphere passing out of the connecting opening. Sensor 3 then responds and switches off steam production. On continuing steaming or combination steaming operation, with a process or apparatus according to the invention ambient atmosphere is immediately sucked in again and sensor 3 is correspondingly cooled, so that by means of control system 18 steam production in boiler 13 is reactivated.

Figure 2:
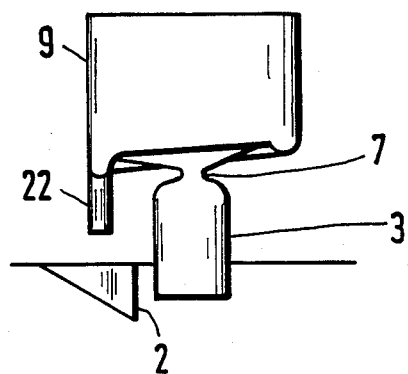
FIG. 2 is a larger-scale representation of a connecting opening with an outflow part suitable for cooling purposes.
Figure 3:
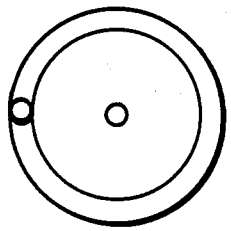
FIG. 3 is a plan view of the object of FIG. 2.

As has been stated hereinbefore, the flow obstacle 2 can be constructed in numerous different ways. In the case of the embodiment according to FIG. 2, e.g. a flow obstacle 2 is in the form of a roughly triangular sheet metal deflector and is positioned upstream of pipe part 4 in the flow direction. This leads to an acceleration of the flow in the vicinity of the pipe part 4, associated with the reduction of the static pressure. It is naturally not necessary for the pipe part 4 to project into the cooking area 5, as shown in FIG. 2, and it can in fact terminate flush with the cooking area top 20.

Figure 4:
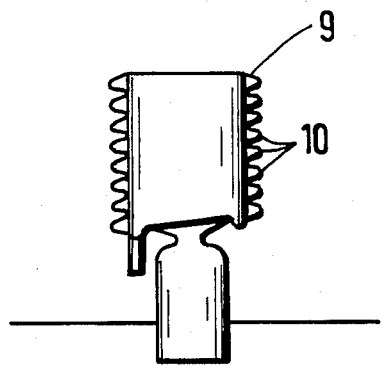
FIG. 4 is a modified embodiment of a connecting opening with an outflow part.

As can e.g. be seen in FIG. 4, the size of the cooking area opening 1 is such that it can be cleaned from cooking area 5.

Towards ambient 6, a suction port 7 is connected to the cooking area 1 and has a much smaller diameter than the latter.

Figure 5:
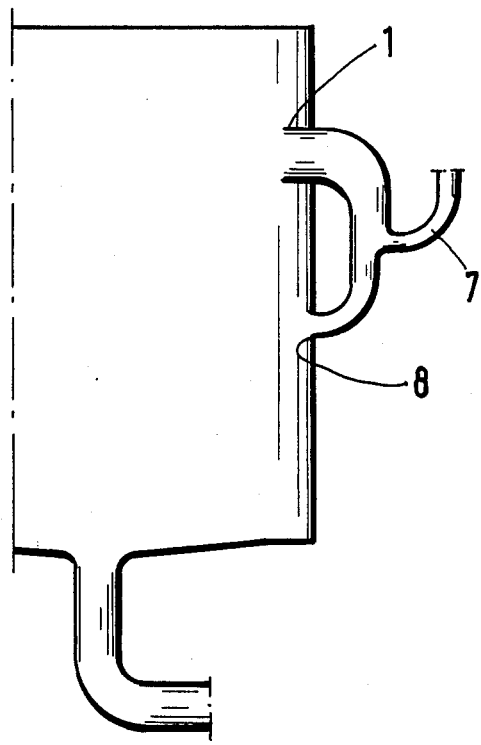
FIG. 5 is a basic representation of an embodiment with an upper and a lower cooking area opening.

In the case of the embodiment shown in FIG. 5, there is a second cooking area opening 8, positioned below the first cooking area opening 1. Outside cooking area 5, the first cooking area opening 1 and the second cooking opening area 8 are in flow connection. Preferably and as shown in FIG. 5, in its lower region said connection has a smaller diameter, roughly half as large as in the upper area, i.e. in the vicinity of the first cooking area opening 8. The suction port 7 branches off from this flow connection and this can otherwise be followed by a configuration as shown in FIGS. 2 and 4.

In the case of the embodiments shown in FIGS. 2 and 4, different constructions of an outflow part 9 are provided, so as to permit cooling of the outflowing cooking area atmosphere. In the embodiment according to FIG. 2, there is merely a single, sudden flow increase. The condensate formed as a result of the outflowing cooking area atmosphere can be removed by steam trap 22.

As has already been explained hereinbefore, the steam trap 22 can continue to be connected to the condensate drain 11. In addition, the complete connecting opening, e.g. pipe part 4 can be connected to the condensate drain 11.

In the embodiment according to FIG. 4, the outflow part 9 has external cooling fins 10. This measure can naturally be provided separately or in combination with the sudden flow increase. In a not shown manner, the outflow part 9 can e.g. have a cooling jacket, through which the cooling fluid can flow.

The features of the invention disclosed in the above description, drawings and claims, can be significant for the realization of the invention in its different forms either singly or in random combinations.

I claim:

1. An apparatus for regulating the heat treatment of food comprising a cooking area, a steam supply regulatable subject to a sensor, a permanently open connection between the cooking area and the ambient having a cooking area opening, and means for creating a circulating flow of cooking medium in the cooking area passing across the cooking area opening, characterized in that adjacent the cooking area opening there is provided a venturi-type flow obstacle creating a local subatmospheric pressure and that the sensor is arranged in the cooking area opening.

2. An apparatus according to claim 1, characterized in that the connecting opening is formed by a pipe part and the latter projects into the cooking area.

3. An apparatus according to any one of the claims 1 or 2, characterized in that a flow obstacle, in the form of a deflector or the like, is arranged in the flow direction upstream of the cooking area opening.

4. An apparatus according to claim 1, characterized in that the size of the cooking area opening is such that it can be cleaned from the cooking area.

5. An apparatus according to claim 4, characterized in that a smaller diameter suction port is connected to the cooking area opening towards the ambient (6).

6. An apparatus according to claim 1, characterized in that second cooking area opening is provided, which is in flow connection with the first cooking area opening outside the cooking area, that the second cooking area opening is positioned below the first cooking area opening and that there is a substantially undisturbed flow of the cooking medium in the vicinity of the second cooking area opening.

7. An apparatus according to claim 1, characterized in that an outflow part is connected to the connecting opening towards the outside and serves to cool the outflowing cooking area atmosphere.

8. An apparatus according to claim 7, characterized in that the outflow part has external cooling fins.

9. An apparatus according to claim 7, characterized in that the outflow part has a cooling jacket.

10. An apparatus according to claim 7, characterized in that with respect to the connecting opening, outflow part is substantially larger so as to cause a sudden flow increase.

11. An apparatus according to claim 7, characterized in that there is provided a condensate drain and condensate formed on the outflow part drains into the condensate drain.

12. An apparatus according to claim 11, characterized in that the connecting opening is connected to the condensate drain.

* * * * *